United States Patent [19]

Brown

[11] Patent Number: 4,740,781

[45] Date of Patent: Apr. 26, 1988

[54] TOUCH PANEL DATA ENTRY DEVICE FOR THIN FILM ELECTROLUMINESCENT PANELS

[75] Inventor: Kenneth A. Brown, Idyllwild, Calif.

[73] Assignee: ITT Gilfillan, Van Nuys, Calif.

[21] Appl. No.: 699,971

[22] Filed: Feb. 8, 1985

[51] Int. Cl.[4] .............................................. G09G 3/00
[52] U.S. Cl. ................................ 340/712; 340/365 C; 340/760; 340/781
[58] Field of Search ................... 340/712, 365 C, 781, 340/760; 178/18, 19; 315/169.3, 169.4

[56] References Cited

U.S. PATENT DOCUMENTS

| | | | |
|---|---|---|---|
| 3,971,013 | 7/1976 | Challoner et al. | 340/365 C |
| 4,110,749 | 8/1978 | Janko et al. | 340/712 |
| 4,230,967 | 10/1980 | Holtz et al. | 340/365 C |
| 4,394,643 | 7/1983 | Williams | 340/365 C |
| 4,468,659 | 8/1984 | Ohba et al. | 340/760 |
| 4,488,150 | 12/1984 | Kanatani | 340/781 |
| 4,506,193 | 3/1985 | Hope et al. | 340/760 |
| 4,516,112 | 5/1985 | Chen | 340/712 |
| 4,535,341 | 8/1985 | Kun et al. | 340/781 |
| 4,554,539 | 11/1985 | Graves | 340/781 |
| 4,559,535 | 12/1985 | Watkins et al. | 340/781 |
| 4,567,480 | 1/1986 | Blanchard | 340/712 |
| 4,568,928 | 2/1986 | Biferno | 340/781 |

OTHER PUBLICATIONS

Sol Sherr—"Display System Design"—May 15/70—pp. 170-172.
"Transflex", from Sierracin Corporation—1979.

Primary Examiner—John W. Caldwell, Sr.
Assistant Examiner—Mahmoud Fatahiyar
Attorney, Agent, or Firm—Robert A. Walsh; Thomas N. Twomey; Mary C. Werner

[57] ABSTRACT

A touch-sensitive device for computer data entry from the presentation on a scanned, thin-film, electroluminescent display. A transparent conductive film is suspended over the display face. Touching that film at a predetermined point in the display capacitively couples scanning voltages (which are time-base synchronous and related to the touched point) to an amplifier and then to a utilization device (computer, for example).

18 Claims, 2 Drawing Sheets

TYPICAL TFEL DISPLAY STRUCTURE

NORMAL OUTPUT, CAPACITIVE TOUCH PANEL ELECTRODE

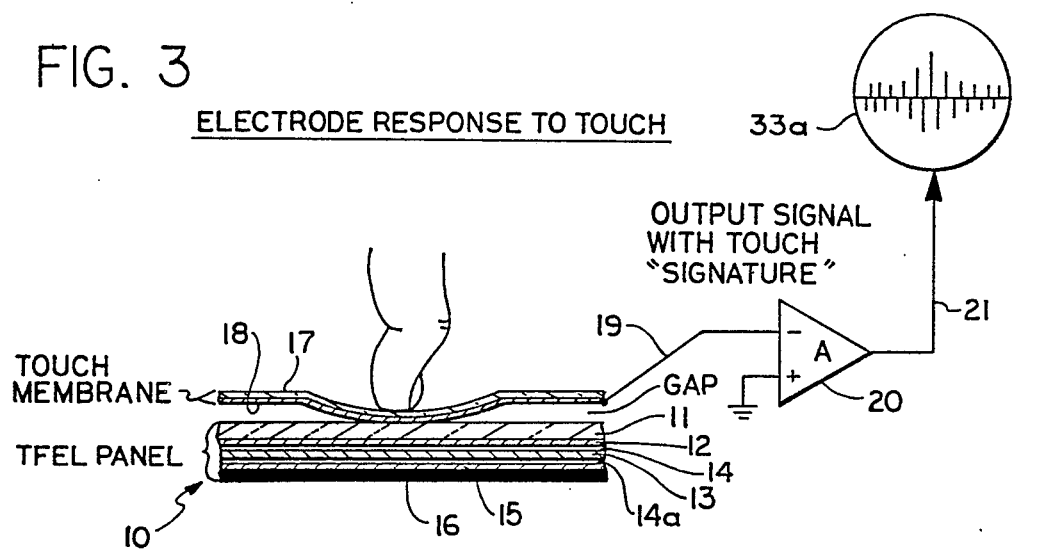
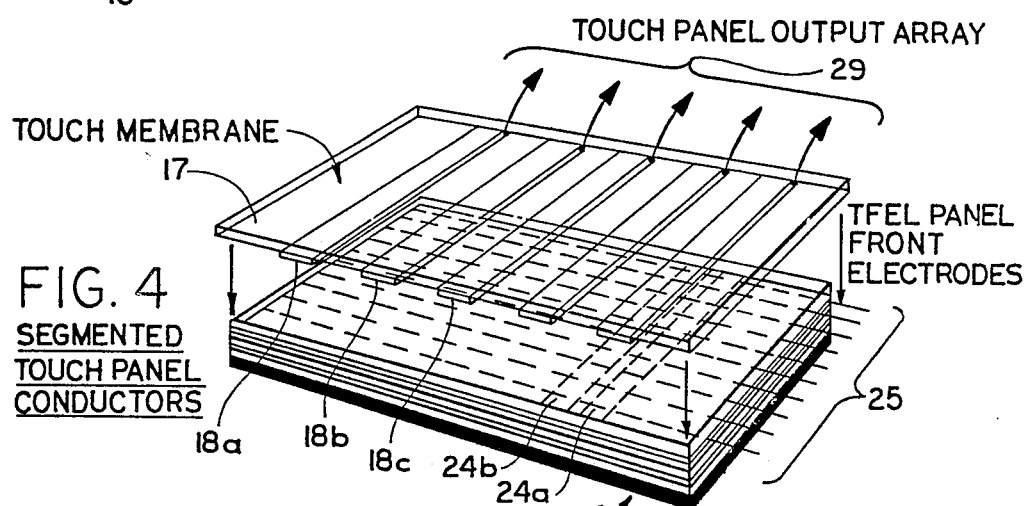
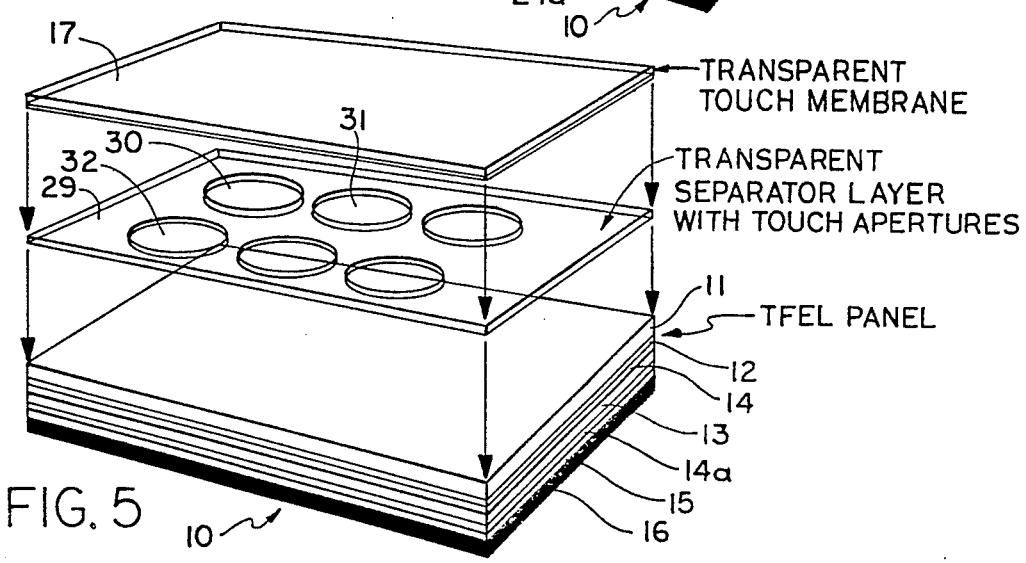

TOUCH PANEL DATA ENTRY DEVICE FOR THIN FILM ELECTROLUMINESCENT PANELS

BACKGROUND OF THE INVENTION

1. Field of the Invention

The invention relates generally to data or signal selection through visual identification on a display and finger touch operation at a discrete location on the display.

2. Description of the Prior Art

Alpha numeric and graphic flat panel displays have been known in basic form for many years and have been employed in illuminated displays for various purposes. Recently there has been increased interest in electroluminescent displays because of their low cost of manufacture, high brightness, reasonable power consumption and physical ruggedness. Accordingly, they have become attractive alternatives to plasma displays, particularly in small size displays.

The known prior art DC plasma display has been fitted with discrete area touch apparatus so that visual selection and finger touch can visually identify a data element to be introduced to a computer and cause its introduction through operation of an associated infrared optoelectronic touch panel (employing infra-red devices). Finger operated mechanical contact switches or push buttons have also played a part in the prior art. The former suffers from a relatively high cost and comparatively low reliability and the latter suffers all the ills of switch contacts while not being readily adapted to the direct selection of an item of data from a display.

The basic electroluminous display and the general state of that art is set forth in a paper by David Lieberman entitled "Electro-Luminescent Displays," published in the periodical "Electronic Products," page 47 et seq. Oct. 15, 1984. That article identifies significant manufacturers of such display devices and is otherwise complete with bibliographic references. From it, the reader can obtain a background in this art and a description of a typical ACTFEL (AC thin-film electroluminescent) display for inlusion in the combination of the invention.

The manner in which the invention employs the aforementioned ACTFEL panel to produce a novel touch-panel data selection from visual identification on the panel will be understood as this description proceeds.

SUMMARY

It may be said to have been the general object of the invention to produce a novel and effective touch-panel employing an ACTFEL panel for the data entry purpose aforementioned and exhibiting the advantages of relatively low cost of manufacture, brightness, ruggedness, reliability, wide temperature range and reasonable power consumption. The system of the invention belongs to a class of devices known as "soft-key" switches.

The fundamental mechanism of a typical ACTFEL display is the production of light from a zinc sulfide manganese phosphor film when energy is capacitively coupled into the film. This can occur when it is sandwiched between two insulated electrodes and the required voltages are applied. In accordance with current technology, the voltage differential necessary to cause light emission is typically on the order of 100 to 200 volts. The voltage versus brightness response of the luminescent material is non-linear, with threshold of light emission being close to saturation. This characteristic permits the implementation of a practical multiplexed display device and the fact that the display has no inherent memory and therefore requires continued regeneration (repetitive scanning) provides an AC field which can be capacitively "picked off" at discrete touch locations to implement the touch panel operation of the invention as will be made clear hereinafter. That is to say, a scanning circuit applies a repetitive waveform so as to produce a moving electric field artifact at the display surface.

In its basic form, the touch sensitive panel for the TFEL display comprises a single transparent membrane, uniformly coated with a conductive indium tin oxide (ITO) layer on the inside (opposite the membrane's touch side). This layer is suspended a short distance above the glass face of the display by means of a transparent separator layer, with apertures through this separator layer over the predetermined touch areas.

When an amplifier with a high input impedance is connected between the ITO layer and the system ground, the continuous summation of all the signals will be present at the amplifier output. This output can be thought of as the normal background signature signal of this touch electrode. When the touch panel is depressed at some point to contact the glass face of the display, the amplitude of the scanning signals induced as the scanning electric field passes the said point will be higher than normal. The difference between the amplitudes of the induced "touch" signals and the aforementioned background level can be used to generate a logic signal keyed to the scan time base, thus identifying the location of the touch and selecting the corresponding data for entry into the utilization device.

The details of a typical embodiment of the invention will be described hereinafter with reference to the drawings.

BRIEF DESCRIPTION OF THE DRAWINGS

FIG. 3 is a view of the TFEL panel of FIG. 2 showing the finger touch effect (exaggerated for clarity).

FIG. 4 is a variation of the arrangement of FIG. 2 showing a segmented touch panel conductive layer (in exploded perspective).

FIG. 5 shows an exploded perspective view of the TFEL panel of FIG. 2 with a separator layer and predetermined touch apetures.

DETAILED DESCRIPTION

Figure 1:
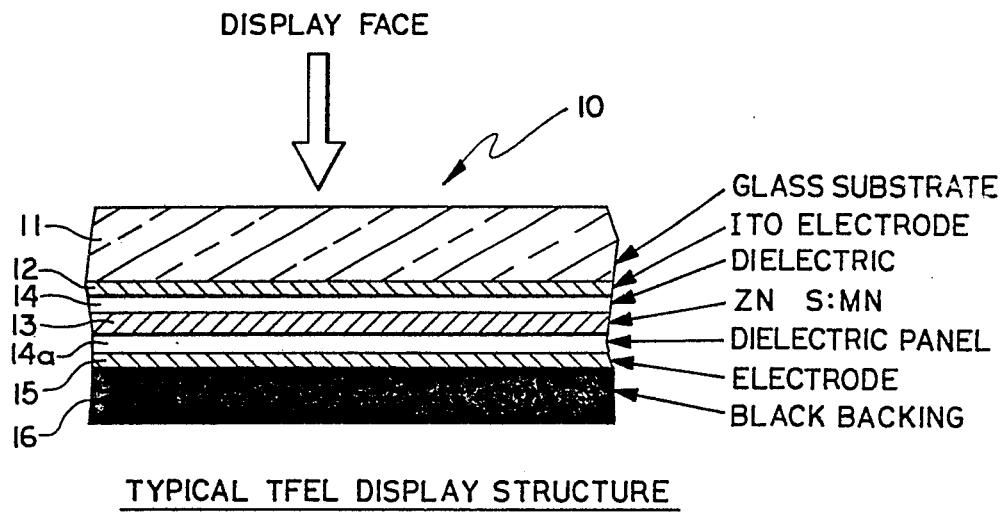
FIG. 1 is a cross-sectional view of the layers making up a typical TFEL panel of known type.

Referring now to FIG. 1, a typical Thin-Film Electroluminescent (TFEL) display structure 10 is depicted in cross-section. The device is to be understood to be generally rectangular as viewed (direction of the display face arrow). That fact is evident from the embodiments of FIGS. 4 and 5.

The TFEL display when identified as an ACTFEL means that it is AC excited, such as by the matrix scan required in the combination of the invention. In the showing of FIG. 1, no scanning provisions are given, this figure being intended to provide a background in the details of the state-of-the-art TFEL display panel.

The ZN S:Mn (zinc sulfide:manganese) phosphor panel 13 is the luminescent element, which is viewed through the glass substrate 11. The electric field is extant between an ITO (indium tin oxide) planar electrode 12 and an electrode 15, these being externally connected between the terminals of a source of energizing potential in a working arrangement. The electrode panel 15 and dielectric panel 14a need not be transparent but the ITO electrode panel 12 must be largely light transmissive. The black backing 16 forms a base for the "sandwich" of thin layers 12 through 15 and may be of black glass or some other non-reflective insulating material to prevent confusing reflections from the display data extant on the luminescent phosphor panel 13. The glass substrate 11 completes the "sandwich."

Figure 2:
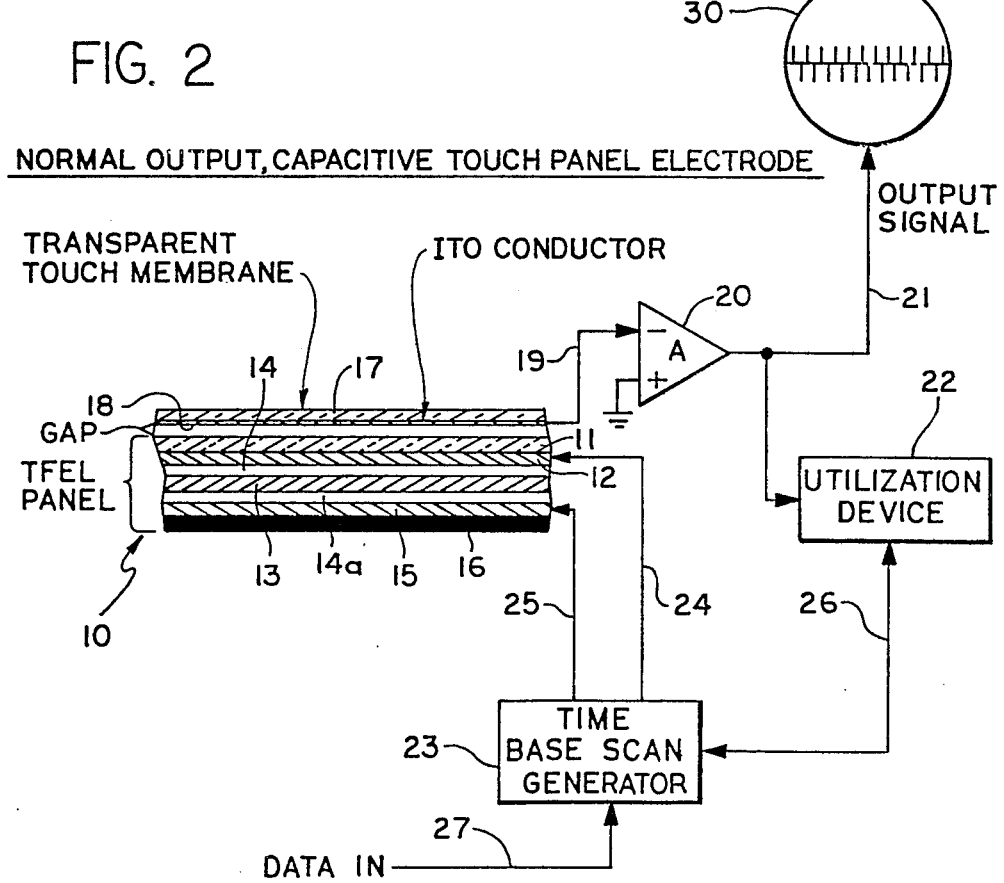
FIG. 2 is a cross-section of the FIG. 1 combination with addition of the touch membrane according to the invention.

Referring now to FIG. 2, the same display panel arrangement 10 of FIG. 1 is shown but with the addition of the insulating transparent touch membrane 17 with its transparent conductive under layer 18. This layer 18 is preferably also on ITO layer to provide the desired conductivity and transparency.

It will be noted that a gap is provided between the conductive under layer 18 and the glass substrate 11. The function of this gap and some particular alternatives for providing it will be understood as this description proceeds in connection with the further drawing figures.

Continuing with the explanation of FIG. 2, it will be noted that an electric scanning signal is supplied to conductive layers ITO planar electrode 12 and electrode panel 15 via leads 24 and 25, respectively, from time base scan generator 23. It is to be assumed and will be further explained subsequently, that ITO planar electrode layer 12 comprises a plurality of parallel-extending narrow strips or wires in one direction and electrode panel layer 15 comprises identical or similar strips in the orthogonal direction. Accordingly, leads 24 and 25 are actually each a plurality of leads and the layers ITO planar electrode 12 and electrode panel 15 thus provide a grid or matrix which are excited from generator 23 according to a time based program.

The scanning voltage provided between 24 and 25 effectively scans this matrix with voltages (pulses) slightly below the light-producing threshold. Images are selectively produced by slightly increasing the voltage pulse level at corresponding matrix locations in accordance with a synchronous data input signal on lead 27.

The utilization device 22 may be a computer which is synchronized or clocked from a generator 23 via lead 26, or the converse may be the case, i.e., device 22 clocks generator 23.

It will be realized that a continuous background level of signals will be induced by capacitive coupling into conductive under layer 18 by the scan voltage pulses, and these will be inputted to amplifier 20 via lead 19. These signals would be as conducted via lead 21 as shown on test oscilloscope face 30, for example.

Referring now to FIG. 3, it will be noted that portions of FIG. 2 have been omitted; however, it is to be understood that the elements of FIG. 2 are present in FIG. 3, the latter figure being presented to illustrate finger touch deflecting the touch membrane 17 and ITO conductor 18 into closer association (or in actual contact) with substrate 11. This increases the capacitive coupling at the point of "touch" (see the oscilloscope face 33a corresponding to this condition).

The space between substrate layer 11 and conductive under layer 18 comtemplated in FIGS. 2 and 3 could be filled with a dielectric fluid as one alternative to the relatively hard to maintian free space gap of FIGS. 2 and 3. Still further, a transparent insulating separator layer 29 can be used as in FIG. 5, wherein touch apertures (typically 30, 31 and 32) facilitate discrete "touch" locations while acting to maintian the quiescent spacing between substrate layer 11 and conductive under layer 18 at other locations across the display.

In FIG. 4, one type of excitation matrix as previously referred to is illustrated in which a bank of parallel extending conductive strips or wires 25 is provided in lieu of a solid conductive electrode 15 (a film as per previous figures). Likewise the orthogonal strips (two of which are illustrated at 24a and 24b) replace the continuous ITO conductor under layer 18. As previously indicated the excitation of the strip matrix is by a form of electronic switching in generator 23 (FIG. 2). A bank of ITO touch membrane strips 18a, 18b and 18c is conductively outputted at point 29 forming a touch panel output array. This structure illustrates another form of discrete "touch" action in lieu of the solid conductive under layer 18.

The multiple output signals at point 29 on FIG. 4 can be combined in amplifier 20, the required identification being provided by the scanning mechanism described hereinbefore.

In accordance with the foregoing description, it will be understood that the invention affords a novel "softkey" switching device meeting the aforementioned general object of the invention.

It will be realized that various modifications within the scope and spirit of the invention will suggest themselves to those of skill in this art. Accordingly, it is not intended that the invention should be regarded as limited by the drawings presented or by this description.

What is claimed is:

1. A display system with touch-panel, soft-key switch for discrete data identification and touch selection, comprising:
    a TFEL panel display having an electro-luminescent member and a non-conductive, transparent substrate through which said display is viewed;
    a matrix of electrodes within said TFEL display arranged to be responsive to electrical scanning signals;
    scanning means connected to said matrix to provide said scannig signals for producing a moving electric field normal to the plane of said luminescent member in synchronism with an externally supplied time base for image production;
    and a flexible, transparent, insulating, touch membrane arranged parallel to said non-conductive, transparent substrate, and spaced therefrom, said membrane including a transparent conductive layer facing said transparent substrate whereby capacitance coupled signals produced by said scanning signals are extant at said conductive layer and appear in greater amplitude corresponding to the increased capacitive coupling at a location where said membrane is depressed toward said transparent substrate and
    mean conductively attached to said membrane conductive layer to provide a signal output terminal.

2. A touch panel, soft-key switch system operatively associated with a TFEL panel display, said display including a planar luminescent member and a non-conductive transparent substrate through which said display is viewed, comprising:

a two coordinate matrix of electrodes within said TFEL display arranged to be responsive to corresponding two-coordinate electrical scanning signals, said electrodes corresponding to each of said coordinates being electrically insulated from each other;

first means responsive to an externally generated time base for generating and applying scanning signals to said matrix of electrodes to produce a moving electric field in two coordinates, said first means including means for amplitudes modulating said scanning signals to a level producing luminescence of said luminescent member in accordance with a data input signal to provide a corresponding visual data presentation on said panel display;

second means comprising a flexible planar, transparent touch membrane disposed parallel to and spaced from said transparent substrate, said second means including a transparent conductive layer carried by said touch member on its surface nearest said transparent substrate; and third means comprising an amplifier having its input connected to said touch membrane conductive layer for producing an output signal including a substantially uniform fraction of said scanning signals capacitively coupled into said touch member conductive layer, said capacitively coupled signals being increased in amplitude when said touch membrane is deflected toward said transparent substrate, said signals of increased amplitude thereby corresponding to the area of said deflection on said touch membrane.

3. A system according to claim 1 in which said TFEL panel display luminescent member is a zinc sulfide:manganese phosphor film.

4. A system according to claim 2 wherein said TFEL panel display planar luminescent member is a zinc sulfide:manganese phosphor film.

5. A system according to claim 1 in which said transparent conductive layer on said touch membrane is an indium tin oxide film.

6. A system according to claim 2 in which said transparent conductive layer carried by said touch membrane is an indium tin oxide film.

7. A system according to claim 1 in which said TFEL panel display is further defined as including a pair of dielectric layers, said layers being disposed, one against each face of said planar luminescent member thereby to insulate said luminescent member from said electrode matrix.

8. A system according to claim 2 in which said TFEL panel display is further defined as including a pair of dielectric layers, said layers being disposed, one against each face of said planar luminescent member thereby to insulate said luminescent member from said electrode matrix.

9. The system according to claim 1 in which said matrix of electrodes comprises first and second close-spaced pluralities of discrete, generally parallel, narrow, conductive film elements, said first film elements extending in a first direction and said second film elements extending in a second direction substantially normal to said first direction.

10. The system according to claim 2 in which said electrode matrix comprises first and second close-spaced pluralities of discrete, generally parallel, narrow, conductive film elements, said first film elements extending in a first direction and said second film elements extending in a second direction substantially normal to said first direction.

11. The system according to claim 1 in which said transparent conductive layer comprises a plurality of generally parallel strips of indium tin oxide film, said strips being arranged to overlay predetermined areas of said panel display.

12. The system according to claim 2 in which said touch membrane transparent conductive layer comprises a plurality of generally parallel strips of indium tin oxide film, said strips being arranged to overlay predetermined areas of said panel display.

13. The system of claim 7 in which said transparent substrate is glass, and in which a base layer of black insulating material is provided, and said glass substrate and said base layer sandwich said electroluminescent member, said electrode matrix and said dielectric layers therebetween.

14. The system of claim 8 in which said transparent substrate is glass, and in which a base layer of black insulating material is provided, and said glass substrate and said base layer sandwich said electroluminescent member, said elecrode matrix and said dielectric layers therebetween.

15. The system according to claim 1 in which a dielectric separator layer is inserted between said conductive layer and said transparent substrate, said separator layer having a plurality of apertures at predetermined locations, thereby to maintian the spacing of said touch membrane conductive layer from said transparent substrate except where said touch membrane is depressed in an area subtended by one of said apertures.

16. The system according to claim 2 in which a dielectric separator layer is inserted between said touch membrane conductive layer and said transparent substrate, said separator layer having a plurality of apertures at predetermined locations, thereby to maintain the spacing of said touch membrane conductive layer from said transparent substrate except where said touch membrane is depressed in an area subtended by one of said apertures.

17. The system according to claim 2 further defined in that said amplifier is a high input impedance amplifier.

18. The combination according to claim 5 includes a high input impedance amplifier having its input connected to said touch membrane transparent conductive layer, the output of said amplifier providing a signal output to a utilization device.

* * * * *